March 24, 1936.  R. E. MILLER  2,035,180
TAPE CUTTER
Filed June 14, 1935
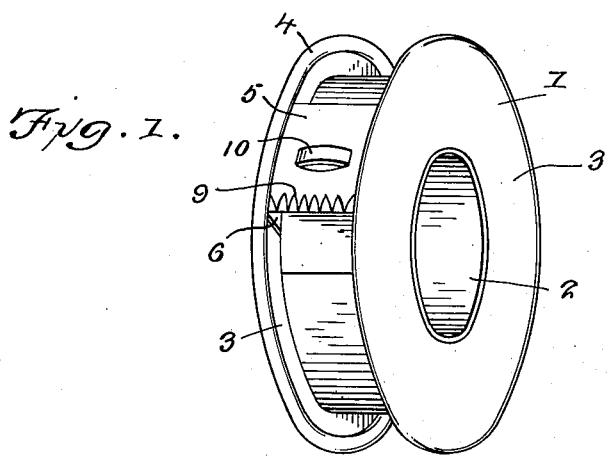
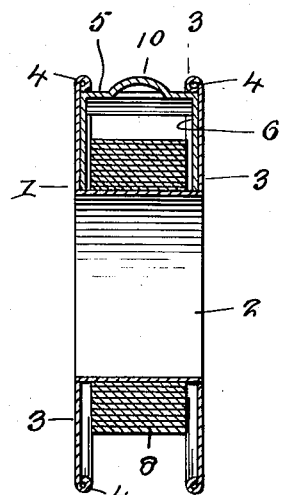
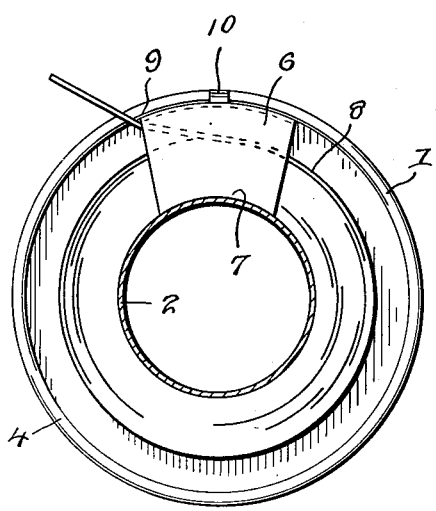
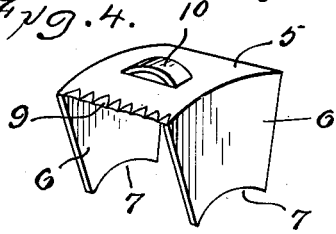
R. Earl Miller
INVENTOR
BY Victor J. Evans & Co.
ATTORNEY Patented Mar. 24, 1936

2,035,180

UNITED STATES PATENT OFFICE 2,035,180

TAPE CUTTER

Roy Earl Miller, Pottsville, Pa.

Application June 14, 1935, Serial No. 26,693

2 Claims. (Cl. 206—59)

My invention relates to spools and more particularly to improvements in cutter elements for spools such as are used for winding up adhesive tape.

The object of my invention is to incorporate with a spool an improved cutter element freely rotatable about the axis of the spool over the tape wound thereon and which is adapted to be readily incorporated with the spool, or detached therefrom, and is securely held in proper relation to the spool and easily manipulated for cutting operations.

Another object is to provide a cutter element for a spool which is light in weight, sufficiently rigid for the purpose of severing the strip and is inexpensive to manufacture.

Other objects are also comprehended by my invention as will presently appear when the following description and claims are read with reference to the accompanying drawing.

In said drawing:

Figure 1 is a view in perspective of a spool and a cutter element constructed according to my invention.

Figure 2 is a view in transverse section.

Figure 3 is a view in section taken on the line 3—3 of Figure 2 looking in the direction indicated by the arrows and, Figure 4 is a view in perspective of the cutter element detached.

Referring to the drawing, the numeral 1 designates the spool which comprises a cylindrical hub member 2 having suitably secured thereon flat end flanges 3 provided with inwardly extending outer edge beads 4. The cutter element is of substantially U-shape form in cross section and comprises an outer segmental plate 5 and segmental side flanges 6 right angularly related to the plate 5 and having curved inner edges 7, respectively. The segmental plate 5 and the inner edges 7 are curved concentrically to the axis of the spool. The cutter element is interposed between the flanges 3 and between the beads 4 and hub member 2, it being understood that it is of the proper dimension to fit snugly against said flanges 3 with the edges of the plate 5 bearing upon the inner periphery of the beads 4 and the edges 7 bearing upon the hub member 2. In this position, as will be clear, the cutter element is freely rotatable about the hub member 2 and the tape 8 wound upon the latter. One end of the plate 5 is serrated to provide an irregular cutting edge 9 for severing the tape. An intermediate portion of said plate 5 is punched outwardly to provide a finger grip portion 10 by means of which the cutter element may be manipulated around the spool or held stationary as occasion may arise. The finger grip portion 10 is disposed within the outer edges of the beads 4 so that the spool may be conveniently packed in a carton or wrapper or may be stood on edge without interference by the hand grip portion. The described cutter element is formed of a single piece of light metal such as aluminum or the like. By flexing the spool flanges 3 apart the cutter element may be readily detached from the spool for replacement purposes as will be manifest.

When it is desired to use the cutter element, a length of the tape 8 is unwound from the spool by pulling upon the same with the tape bearing against the cutting edge 9 thereby rotating the spool relative to the cutter or vice versa, as desired. The cutter element is then held stationary relative to said spool and the length of tape severed against the cutting edge 9 in a manner which will be understood without further explanation.

The described details of construction are susceptible of modification without departing from the inventive concept disclosed and it is to be understood that right is herein reserved to such modification of details falling within the scope of the appended claims.

What I claim is:

1. The combination with a spool having a cylindrical hub member, of circular end flanges thereon provided with inwardly projecting outer edge beads, a cutter element freely rotatable about said hub member comprising, an outer curved plate having a serrated cutting edge and side flanges right angularly related thereto and provided with curved inner edges, said plate extending between the end flanges of the spool and bearing upon the inner peripheries of said beads, said curved edges bearing upon said hub member, and said plate and edges being curved concentrically to said hub member.

2. As an article of manufacture a cutter element comprising, a curved plate having a serrated end edge and an intermediate punched up portion, and side flanges extending at right angles to said plate and having curved edges opposite said plate, respectively, the curvature of the plate and said edges being concentric and in the arc of a circle.

ROY EARL MILLER.